United States Patent
Pei et al.

(10) Patent No.: US 10,282,824 B2
(45) Date of Patent: May 7, 2019

(54) METHOD AND SYSTEM FOR ELIMINATING STRIPE NOISE IN INFRARED IMAGES

(71) Applicant: SHENZHEN UNIVERSITY, Shenzhen, Guangdong (CN)

(72) Inventors: Jihong Pei, Guangdong (CN); Mi Zou, Guangdong (CN); Weixin Xie, Guangdong (CN); Xuan Yang, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 15/838,404

(22) Filed: Dec. 12, 2017

(65) Prior Publication Data
US 2018/0174274 A1 Jun. 21, 2018

Related U.S. Application Data

(63) Continuation of application No. PCT/CN2016/082581, filed on May 19, 2016.

(51) Int. Cl.
G06T 5/00 (2006.01)
H04N 5/33 (2006.01)
H04N 5/217 (2011.01)
H04N 5/365 (2011.01)

(52) U.S. Cl.
CPC ............ *G06T 5/002* (2013.01); *H04N 5/217* (2013.01); *H04N 5/33* (2013.01); *H04N 5/3658* (2013.01); *G06T 2207/10048* (2013.01)

(58) Field of Classification Search
CPC .......... G06T 5/002; G06T 2207/10048; H04N 5/217; H04N 5/33
See application file for complete search history.

(56) References Cited

U.S. PATENT DOCUMENTS

| | | | | |
|---|---|---|---|---|
| 8,180,168 B2 * | 5/2012 | Bergman | ................. | G06K 9/40 382/260 |
| 9,213,883 B2 * | 12/2015 | Kim | .................. | G06K 9/00201 |
| 9,230,304 B2 * | 1/2016 | Lee | ......................... | G06T 5/009 |
| 9,237,284 B2 * | 1/2016 | Hogasten | ............. | H04N 5/3658 |
| 10,002,434 B2 * | 6/2018 | Fan | ......................... | G06T 3/403 |
| 2010/0310178 A1 * | 12/2010 | McCandlish | ........ | G06K 9/4604 382/202 |

(Continued)

*Primary Examiner* — Brian P Yenke

(57) ABSTRACT

A method of eliminating stripe noise for infrared images including: selecting a specific row of data from an to-be-filtered image Aim, and obtaining a stripe width N1 from information of a frequency spectrum of the data; intercepting (N1+1) new sequences of different lengths from a specific row sequence of the image according to the stripe width N1, and obtaining an optimal interception length N by analyzing information of amplitude spectrum of each new sequence; splitting the to-be-filtered image Aim with a size of M×$N_n$ into a pair of optimum to-be-filtered sub-images Bim and Cim with a size of M×N according to the length N; obtaining two sub-images Bimf and Cimf after using a notch-comb filter to filter the two optimum to-be-filtered sub-images Bim and Cim; carrying out a brightness adjustment and a combination process to the two sub-image Bimf and Cimf to obtain an image Aimf.

7 Claims, 11 Drawing Sheets

(56) References Cited

U.S. PATENT DOCUMENTS

| | | | | |
|---|---|---|---|---|
| 2011/0262053 | A1* | 10/2011 | Strandemar | G06K 9/6289 |
| | | | | 382/263 |
| 2013/0016900 | A1* | 1/2013 | Kim | G06T 5/20 |
| | | | | 382/162 |
| 2013/0121594 | A1* | 5/2013 | Kawatani | G06K 9/00442 |
| | | | | 382/199 |
| 2013/0121595 | A1* | 5/2013 | Kawatani | G06K 9/00449 |
| | | | | 382/199 |
| 2014/0092257 | A1* | 4/2014 | Hogasten | H04N 5/33 |
| | | | | 348/164 |
| 2014/0240512 | A1* | 8/2014 | Hogasten | H04N 5/2257 |
| | | | | 348/164 |
| 2015/0269742 | A1* | 9/2015 | Bergstrom | H04N 5/332 |
| | | | | 348/164 |
| 2015/0312489 | A1* | 10/2015 | Hoelter | H04N 5/33 |
| | | | | 348/164 |
| 2016/0255290 | A1* | 9/2016 | Wajs | H04N 9/64 |
| | | | | 348/164 |
| 2017/0221213 | A1* | 8/2017 | Fan | G06T 7/12 |
| 2017/0318241 | A1* | 11/2017 | Nishikawa | H04N 5/357 |
| 2018/0063454 | A1* | 3/2018 | Olsson | H04N 5/3651 |

\* cited by examiner

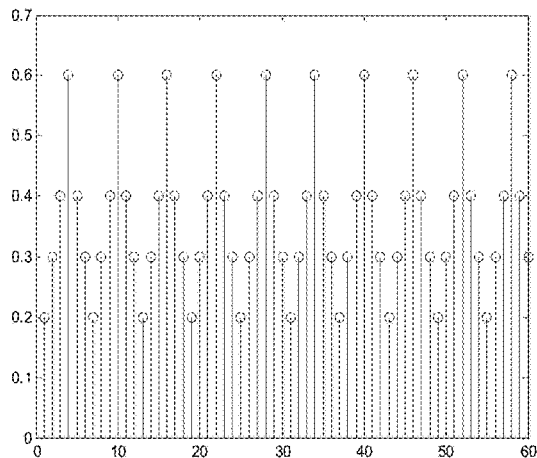
Fig. 2C

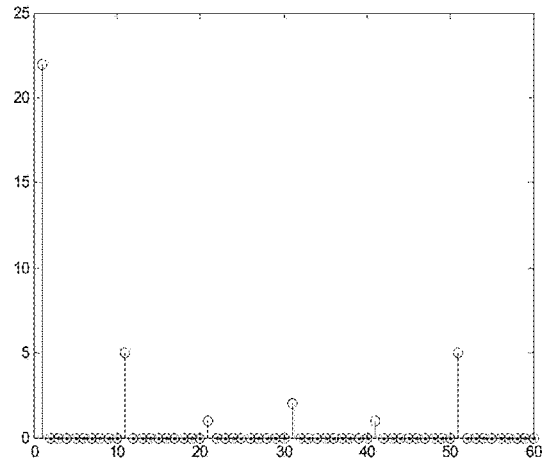
Fig. 2D

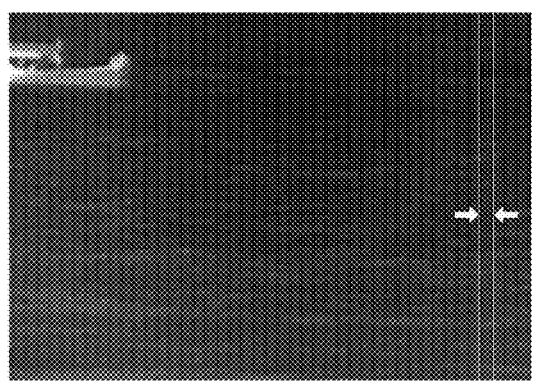
Fig. 3A

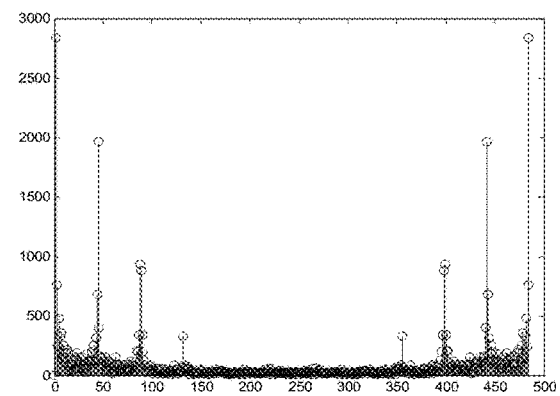
Fig. 3B

S21
defining the specific row of data in the to-be-filtered image as an one-order discrete sequence, intercepting (N1+1) new sequences of different lengths according to the stripe width N1, computing the amplitude spectrums of each new sequence of different length S22
extracting the first peak values that represent the noise components from the amplitude spectrums of each new sequence to be a group of characteristic values, computing extremum of the group of characteristic values, obtaining the optimal interception length N

Fig. 4

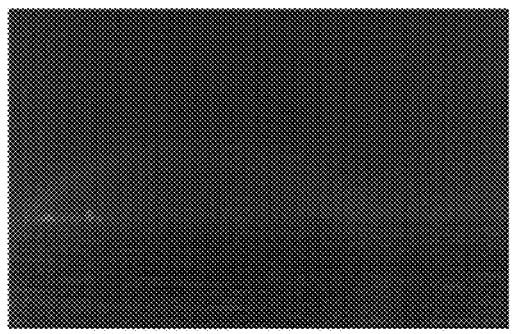 
Fig. 13A  Fig. 13B
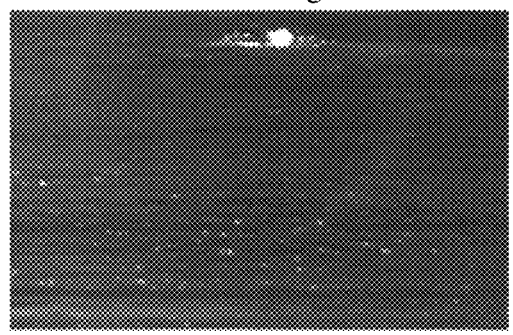 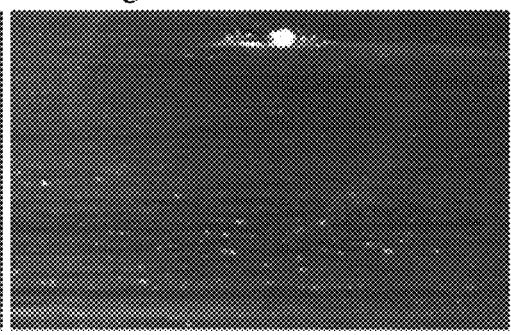
Fig. 13C  Fig. 13D
 
Fig. 13E  Fig. 13F
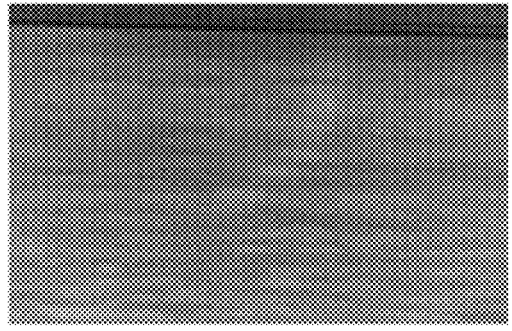 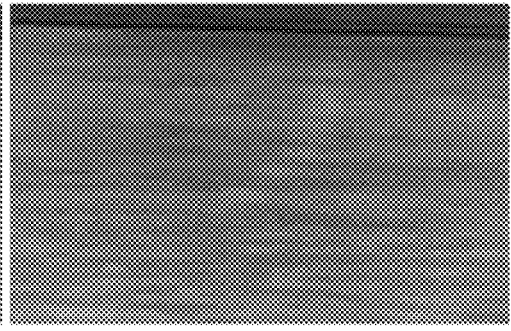
Fig. 13G  Fig. 13H

METHOD AND SYSTEM FOR ELIMINATING STRIPE NOISE IN INFRARED IMAGES

CROSS-REFERENCE TO RELATED APPLICATIONS

This application is a Continuation Application of PCT Application No. PCT/CN2016/082581, filed on May 19, 2016, the entire contents of which are hereby incorporated by reference.

TECHNICAL FIELD

The present invention relates to the technology field of image processing, and in particular to a method and a system for eliminating stripe noise in infrared images.

BACKGROUND OF THE DISCLOSURE

Infrared technology has been applied in fields of biology, medical science, geosciences, military reconnaissance, etc. Compared with visible light image, the infrared image having a lower signal-to-noise ratio is easily contaminated by different noises, wherein the stripe noise is one of the noises often existing in the infrared image. The reasons of causing the stripe noise are complicated, for example, process differences of multi-sensor, aging of the instrument and elements, and the internal calibration system error, etc. which result in different conversion transfer function for various detection unit. The external environmental interferences (e.g. temperature, the other ambient apparatuses) during the acquisition process of the infrared image is also one of the reasons. The detection and extraction for the useful information in an infrared image are interfered by the presence of stripe noises, particularly the recognition and target tracking capability based on the infrared image are affected thereby. Accordingly, the use of stripe noise removal algorithms first eliminating the stripe noise in the infrared image will greatly improve the reliability of the subsequent processing and analysis for the infrared image.

The stripe noise in the images is typically a periodic noise, which, represented in the frequency domain, is the appearance of noise components in fixed frequency points in the frequency domain. In order to filter out such periodic noise frequency components, it is first necessary to find out the corresponding positions of the noise frequency components in the frequency domain, then the notch filter is used to filter out the noise, and finally the signal is restored to the time-domain or spatial-domain. The chief of all is how to find the correct noise frequency point, and how to design a proper notch filter.

One of the problems in the methods for eliminating stripes in images in prior art is that the position determination of the noise frequency component is not intelligent or accurate. One of the conventional methods uses manual detection for the corresponding positions of the noise frequency components, which is a time-consuming method with low calculation efficiency that cannot meet the application requirement of a large data, and is affected by manual subjective factors; another method in the prior art is to locate the frequency point of stripe noise according to the image projection of the amplitude spectrum. For this method, the amplitude spectrum of the image is respectively projected in a row direction and a column direction, the location of the noise frequency component is subsequently obtained by a cumulative distribution function after projection. Compared with the manual method, the efficiency is improved by the present method.

The method for eliminating stripe noise in images in the prior art has another problem i.e. the problem about periodic alignment. Only when the collected signals have stringent full cycle, are the noise frequency components of the periodic noise in the image concentrated to limited frequency points. If the stripe noise in the image does not have a stringent full cycle, the noise frequency components will be differently diffused in the entire frequency domain. If prior to the filtering, the image is not aligned with the pre-treatment period, the use of a notch filter method cannot completely filter out the stripe noise frequency components.

SUMMARY OF THE DISCLOSURE

With regard to the drawbacks of the prior art, the object of the present invention is to provide a method and system for eliminating stripe noise in infrared images, which aims to solve the problems that the infrared image including stripe noises of different intensity cannot be processed in auto and high efficiency in the existing stripe noise removal technology.

To achieve above objects, a method of eliminating stripe noise for infrared images is provided by the present invention, which includes following steps:

S1: selecting a specific row of data from a to-be-filtered image Aim, and obtaining a stripe width N1 from information of a frequency spectrum of the specific row of data;

S2: intercepting (N1+1) new sequences of different lengths from a specific row sequence of the image according to the stripe width N1, and obtaining an optimal interception length N by analyzing information of an amplitude spectrum of each new sequence;

S3: splitting the to-be-filtered image Aim with a size of M×$N_n$ into a pair of optimum to-be-filtered sub-images Bim and Cim with a size of M×N according to the optimal interception length N;

S4: obtaining a first sub-image Bimf and a second sub-image Cimf after using a notch-comb filter to respectively filter the two optimum to-be-filtered sub-images Bim and Cim;

S5: carrying out a brightness adjustment and a combination process to the first sub-image Bimf and the second sub-image Cimf to obtain an image Aimf.

Furthermore, in step S1, the stripe width $$N1 = \left\lfloor \frac{N_n}{k_m - 1} \right\rfloor,$$

wherein $\lfloor \cdot \rfloor$ indicates round down, in which a fraction part is removed and an integer is kept; $N_n$ indicates a length of a single row of data, $k_m$ indicates an amplitude spectrum coordinate corresponding to a first peak value at medium-high frequency.

Furthermore, step S2 includes following steps:

S21: defining in a discrete sequence x(n) with $N_n$ points by using the specific row of data having a length of $N_n$; intercepting (N1+1) new sequences of different lengths from the discrete sequence x(n) according to the stripe width N1, and computing amplitude spectrums of the new sequences of different lengths;

S22: extracting the first peak value that represents noise component to be a group of characteristic values $\{|X_{N_n-0}$ $(k=k_{m0})|$, $|X_{N_n-1}(k=k_{m1})|$, $|X_{N_n-2}(k=k_{m2})|$, ..., $|X_{N_n-N1}(k)=k_{mN1}|\}$ from the amplitude spectrums of the new sequences of different lengths $|X_{N_n-0}(k)|$, $|X_{N_n-1}(k)|$, $|X_{N_n-2}(k)|$, ..., $|X_{N_n-n1}(k)|$), wherein $k_{m0}$, $k_{m1}$, ..., $k_{mN1}$ are the amplitude spectrum coordinate $k_m$ corresponding to the first peak value in each of the amplitude spectrum of the new sequences $|X_{N_n-0}(k)|$, $|X_{N_n-1}(k)|$, $|X_{N_n-2}(k)|$, ..., $|X_{N_n-N1}(k)|$; computing an extremum of the group of characteristic values and obtaining the optimal interception length N.

Furthermore, in step S21, the step of intercepting (N1+1) new sequences of different lengths from the discrete sequence x(n) according to the stripe width N1 further comprises: defining a first point of the sequence as a start point, intercepting the first $N_n$ points, first $N_n-1$ points, first $N_n-2$ points, ..., first $N_n-N1$ points are selected sequentially to have the new sequences, the new sequences being recorded as $X_{N_n-0}(n)$, $X_{N_n-1}(n)$, $X_{N_n-2}(n)$, ..., $X_{N_n-N1}(n)$.

Furthermore, in step S22, an ergodic local interval $[0.5k_m, 1.5k_m]$ is implemented to find out a position of a local maximum so as to obtain a position of the first peak value of noise frequency component.

Furthermore, in step S4, parameters of notch-comb filter is determined by detecting locations of noise frequency components of the optimum to-be-filtered sub-images Bim and Cim.

Furthermore, in specific, said step of determining the parameters of notch-comb filter further comprises:

selecting the to-be-processed noise frequency component, and computing distances $D_{ki1}(u, v)$ and $D_{ki2}(u, v)$ between each point and coordinates corresponding to the noise frequency component;

obtaining a cutoff frequency $D_{0ki}$ according to the selected to-be-processed noise frequency component;

obtaining the parameters of notch-comb filter according to the distance and the cutoff frequency.

Furthermore, in step S5, the brightness adjustment further comprises: taking a mean value of the DC components of the first sub image Bimf and the second sub-image Cimf as the DC component of both; and the combination process further comprises: computing a mean value of the first sub-image Bimf and the second sub-image Cimf in an overlapping region, and an effective value in a non-overlapping region.

The present invention further provides a system of eliminating stripe noise for infrared images including:

an evaluation module, configured for selecting a specific row of data from a to-be-filtered image Aim, and obtaining as tripe width N1 from information in a frequency spectrum of the specific row of data;

a query module, configured for intercepting (N1+1) new sequences of different lengths from the specific row sequence of the image according to the stripe width N1, and obtaining an optimal interception length N by analyzing information of the amplitude spectrum of each new sequence;

a splitting module, configured for splitting the to-be-filtered image Aim with a size of M×$N_n$ into a pair of optimum to-be-filtered sub-images Bim and Cim with a size of M×N according to the optimal interception length N;

a filter module, configured for obtaining a first sub-image Bimf and a second sub-image Cimf after using a notch-comb filter to filter the two optimum to-be-filtered sub-images Bim and Cim respectively; and a combination module, configured for carrying out a brightness adjustment and a combination process to the first sub-image Bimf and the second sub-image Cimf to obtain an image Aimf.

The present invention realizes a method and system for eliminating stripe noise in infrared images which solves the problems of the failure to automatically process the infrared images containing stripe noises of different intensity with high efficiency in the existing stripe noise elimination techniques. Specifically, according to the periodicity of the noise, the alignment length of the period is selected first to split an image into two sub-images which have overlapping regions, and the two sub-images are subsequently filtered in frequency domain. For the frequency domain filtering, firstly, according to the characteristics of Discrete Fourier Transformation of the finite-length periodic sequence, the noise frequency components in the frequency domain are found out, then with regard to each pair of noise frequency components, the adaptive band-stop Butterworth notch filter is subsequently designed for filtering; finally, brightness adjustment and combination process of the two filtered sub-images are carried out to obtain a final result. Compared with the existing stripe noise removal methods, the present invention is less manual participation, higher batch processing efficiency, better filtering result, and particular suitable for processing a large deal of infrared video data with noise stripes.

BRIEF DESCRIPTION OF THE DRAWINGS

FIG. 2C is a schematic diagram of a finite-length periodic sequence obtaining from the periodic extension of a sub-sequence shown in FIG. 2A in the embodiment of the present invention;

FIG. 2D is an amplitude spectrum diagram of the sequence shown in FIG. 2C in the embodiment of the present invention;

FIG. 3A is a to-be-filtered infrared image in the embodiment of the present invention;

FIG. 3B is an amplitude spectrum diagram of the data in the first row of the image shown in FIG. 3A in the embodiment of the present invention;

FIG. 4 is a detailed flow chart for searching the optimal interception length in the embodiment of the present invention;

FIGS. 13A-13H are the infrared image comparison diagrams before and after filtering of a couple of examples in the embodiment of the present invention;

DETAILED DESCRIPTION OF THE INVENTION

In order to specify and better understand the objects, technical solution and merits, the present invention will be further described in detail with reference to the drawings and embodiments. It is to be understood that the embodiments described hereinafter are only used to explain the present invention and are not intended to limit the present invention.

The present invention provides a stripe noise removal method which fully utilizes the characteristics of periodic noise in frequency domain when finding the position of the noise frequency component and automatically modifies the filter parameters according to the feedback until the desired filtering effect can be achieved. The method provided by the present invention enables to self-adaptively process various stripe noises with different intensity without manual participation, and can automatically, efficiently and accurately filter out stripe noises with different intensity in the images.

Hereinafter, the method for stripe noise removal in infrared images provided by the present invention is employed exemplarily to eliminate the vertical stripe in images. Regarding the horizontal stripes, horizontal stripes will be vertical stripes by simply rotating the image by 90 degrees before being processed.

With respect to the vertical stripes, the specific method for stripe noise removal in the infrared images provided by the present invention includes: first of all, selecting a specific row from the image, and estimating the stripe width by analyzing the information of frequency spectrum; then, intercepting new sequences of different lengths from the specific row sequence of the image based on the stripe width, and finding out an optimal interception length by analyzing the information from the amplitude spectrum of each new sequence; and then, splitting the to-be-filtered original image into a pair of optimum to-be-filtered sub-images according to the optimal interception length; after that, detecting the position where the noise frequency component of the sub-images locates, and designing a notch-comb filter to filter the optimum to-be-filtered sub-images frequently; at last, amalgamating the pair of filtered sub-images to obtain a final result.

Figure 1:
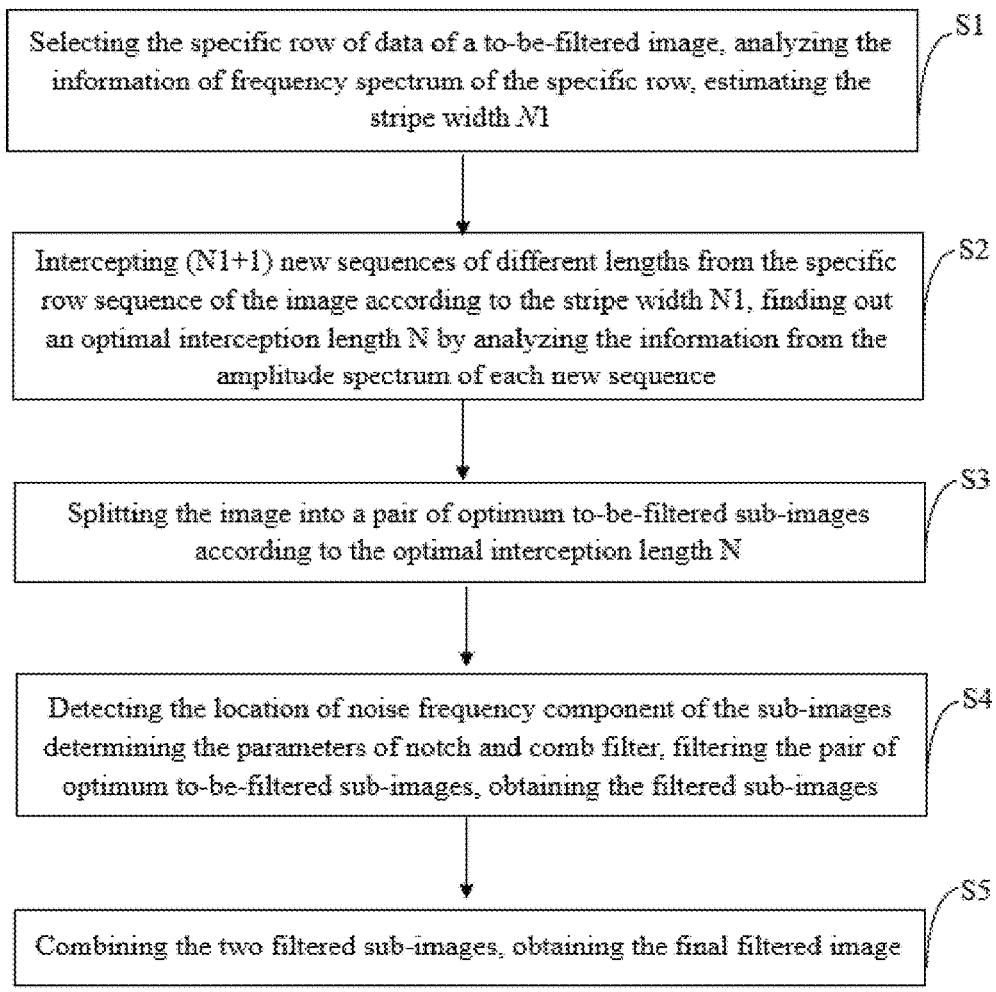
FIG. 1 is the flow chart of the method of eliminating stripe noise for infrared image provided by the embodiment of the present invention.

FIG. 1 shows the process of the method for stripe noise removal in infrared images provided by the present invention, which including the following steps:

S1: selecting the specific row of data of a to-be-filtered image Aim, analyzing the information of frequency spectrum and estimating the stripe width N1.

Figure 2A:
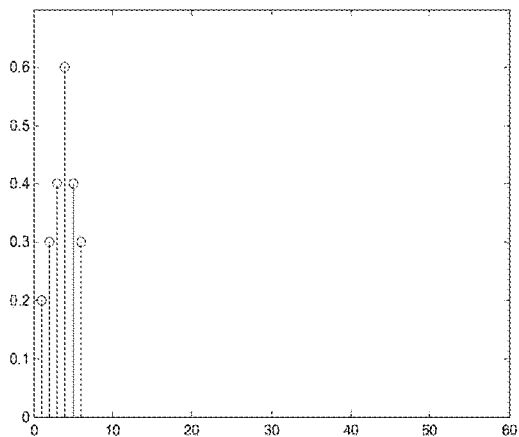
FIG. 2A is a schematic diagram of a sub-sequence according to the embodiment of the present invention.
Figure 2B:
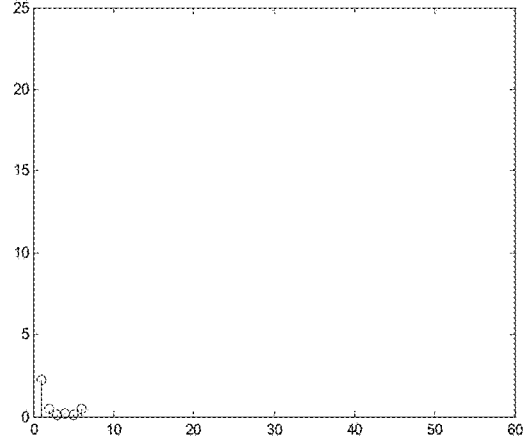
FIG. 2B is an amplitude spectrum diagram of the sequence shown in FIG. 2A in the embodiment of the present invention.

For the images containing stripe noises, it is assumed that the stripe noise is a periodic noise that employs the stripe width N1 as a noise period. The images containing the vertical stripes are equivalent to superimpose a finite-length periodic noise sequence with the stripe width N1 being as a noise period to each row of the sequences in the image. The definition of the finite-length periodic sequence is a result of a multiple periodic extension of a sub-sequence. FIG. 2A shows a 6-point discrete sequence, FIG. 2C shows a new sequence obtained from 9 times of periodic extension (i.e., containing 10 sub-sequences) by using the 6-point discrete sequence shown in FIG. 2A being as the sub-sequence. This new sequence is the finite-length periodic sequence. FIG. 2B shows the amplitude spectrum of the sequence shown in FIG. 2A. FIG. 2D shows the amplitude spectrum of the finite-length periodic sequence shown in FIG. 2C. FIG. 2B and FIG. 2D show that the amplitude spectrum of the finite-length periodic sequence which is obtained after 9 times of periodic extension of the sub-sequence is relevant to the amplitude spectrum of the sub-sequence and the times of periodic extension. The amplitude spectrum of finite-length periodic sequence is equivalent to an amplitude spectrum which is obtained by multiplying all amplitude values by ten after inserting nine zero values between all adjacent values of the amplitude spectrum of sub-sequence. As a property of the finite-length periodic sequence, this phenomenon is not an accident. With regard to all finite-length periodic sequences, if a sequence is obtained after m times of periodic extension of a sub-sequence, then the amplitude spectrum of the sequence can be obtained by magnifying the amplitude spectrum after inserting zero values into the amplitude spectrum of sub-sequence. Specifically, m zero values are inserted between all adjacent values of the amplitude spectrum of sub-sequence, and then all of the values are magnified by (m+1) times. Such property of the finite-length periodic sequence can be proved by Discrete Fourier Transform, which is not demonstrated in detail hereinafter.

In the present invention, the method for obtaining stripe width N1 includes: selecting a specific row of data from the original image Aim (assuming that the length of a single row of data is Nn) as a discrete sequence x(n) with $N_n$ points, wherein the specific row may be any row. However the data in the intermediary rows are more stable so that the intermediary rows are selected as the specific rows in the present invention. According to the Discrete Fourier Transform formula, the Discrete Fourier Transformation X(k) of x(n) is shown in formula (1). The absolute value |X(k)| of X(k) is subsequently computed to acquire the amplitude spectrum of x(n). In the present invention, X(k) is computed by Fast Fourier transform. Hereinafter, the Fast Fourier transform is employed by all in the present invention, when it comes to compute the amplitude spectrum of a sequence as well as the amplitude spectrum of a two-dimensional sequence.

$$X(k) = \sum_{n=0}^{N_n-1} x(n)\exp\left(-j\frac{2\pi}{N}nk\right) \quad (1)$$

FIG. 3A shows a to-be-filtered infrared image a, wherein the region outlined by two straight lines is a complete stripe. As described above, the amplitude spectrum of finite-length periodic sequence is an equivalent result after inserting zero values into the amplitude spectrum of sub-sequence and then being magnified. In terms of the images containing stripe noise, the stripe noise therein corresponds to the result of multiple periodic extensions for a single parent sub-stripe. Therefore, compared with the frequency components of the whole image, the noise frequency components will show up on the uniformly-spaced positions in the spectrogram. And the amplitude values of noise frequency component are relatively large, presenting as the local peak value. FIG. 3B shows the amplitude spectrum of the sequences from intermediary rows shown in FIG. 3A, and the amplitude spectrum is not centralized. The peak value presenting at medium-high frequency therein is the frequency component of the noise (DC components are out of consideration).

In order to estimate the stripe width, the method used by the present invention includes: figuring out the amplitude spectrum coordinates $k_m$ corresponding to the first peak value at medium-high frequency, by that way the stripe width is determined as $$N1 = \left\lfloor \frac{N_n}{k_m - 1} \right\rfloor,$$

wherein $\lfloor \cdot \rfloor$ indicates rounding down (i.e. the decimal part is removed, and the integer is kept unchanged).

The method for acquiring the amplitude spectrum coordinates $k_m$ corresponding to the first peak value in the present invention includes: in terms of amplitude spectrum $|x(k)|$, defining $S_{Xk}$ as an eleven-element set centered on $|X(k)|$, the eleven-element set being $\{|X(k+i)|, i=-5, -4, \ldots, 0, 1, \ldots, 4, 5\}$, wherein $\max[S_{Xk}]$ is the value of the element having a maximum value in $S_{Xk}$, $\text{med}[S_{Xk}]$ is the value of the element having a medium value in $S_{Xk}$, i.e. ordering the elements of the set from the greatest to the smallest, the value of the element arranged in the middle. Accordingly, $k_m$ is computed by following formula:

$$k_m = \min \left\{ k \mid \max[S_{Xk}] = |X(k)| \text{ and } \frac{|X(k)|}{\text{med}[S_{Xk}]} \geq \theta > 1, k = 5, 6, 7, \ldots, N_n - 6 \right\}$$

wherein, $k_m$ is a minimum of the k values satisfying that $|X(k)|$ is the local maximum, and the local maximum is greater than the local medium values. In the above formula, $\theta$ is a threshold that indicates the differences between the local maximum and the local medium, the greater the threshold is, the greater the differences between the local maximum and the local medium are. In the present invention, when the image contains a strong noise, it selects a threshold $\theta=5$; when the noise is weak, it selects a threshold $\theta=2$. The selection of the threshold is adjusted depends on the actual situation.

For example, in terms of image a shown in FIG. 3A with the length of a row of data Nn=485, the amplitude spectrum of the first peak value at medium-high frequency $k_m$=45 is computed, such that stripe width N1=12 can be computed.

S2: intercepting (N1+1) new sequences with different lengths from the specific row sequence of the image by utilizing the stripe width N1, obtaining an optimal interception length N by analyzing the information from the amplitude spectrum of each new sequence.

Wherein the optimal interception length refers to the new sequence of certain length intercepted from the original sequence which has the most concentrated noise frequency components in the frequency spectrum thereby the length of the sequence being the optimal interception length. Due to the fact that the distribution of noise frequency components in the frequency spectrum of the original sequence will have an apparent variation by removing the last point, the last two points, or the last multiple points, we aim to find out an interception length, so that the sequence with the length has a most concentrated noise frequency components in the frequency spectrum, so as to facilitate the following filtering process.

Furthermore, as shown in FIG. 4, step S2 further includes the following steps:

S21: defining the specific row of data (data length Nn) from the to-be-filtered image Aim as a discrete sequence x(n) with Nn points, intercepting new sequences of different lengths from x(n) according to the stripe width N1, and computing the amplitude spectrum of the new sequences of different lengths.

Wherein the intermediary row is still selected as the specific row, namely the intermediary row is selected to be a discrete sequence x(n) with Nn points. According to stripe width N1, intercepting new sequences of different lengths from x(n) refers to: selecting the first point of the sequence to be a start point, intercepting the first Nn points, the first Nn−1 points, the first Nn−2 points, . . . , the first Nn−N1 points as the new sequences, the new sequences being recorded as $X_{N_n-0}(n)$, $X_{N_n-1}(n)$, $X_{N_n-2}(n)$, . . . , $X_{N_n-N1}(n)$. Similarly, according to Discrete Fourier Transform, the amplitude spectrum of each sequence $|X_{N_n-0}(k)|$, $|X_{N_n-1}(k)|$, $|X_{N_n-2}(k)|$, . . . , $|X_{N_n-n1}(k)|$, is computed. Regarding the intermediary row of data of the image a shown in FIG. 3A as the original data, thirteen new sequences of different lengths are intercepted, and the amplitude spectrum of each sequence is computed as shown in FIGS. 5A-5M. FIGS. 5A-5M show that adding or removing a point to/from a sequence, a large difference would be appeared to the corresponding amplitude spectrums, in especially, the frequency components that indicate the periodic noise would have apparent changes.

S22: Extracting the first peak values that represent the noise components to be a group of characteristic values i.e. $\{|X_{N_n-0}(k=k_{m0})|, |X_{N_n-1}(k=k_{m1})|, |X_{N_n-2}(k=k_{m2})|, \ldots |X_{N_n-N1}(k)=k_{mN1}\}$ from the amplitude spectrum of each of the new sequences of different lengths (i.e. $|X_{N_n-0}(k)|$, $|X_{N_n-1}(k)|$, $|X_{N_n-2}(k)|$, . . . , $|X_{N_n-n1}(k)|$, wherein $k_{m0}$, $k_{m1}$, . . . , $k_{mN1}$ represents the amplitude spectrum coordinate $k_m$ corresponding to the first peak value in each of the amplitude spectrums of the new sequences $|X_{N_n-0}(k)|$, $|X_{N_n-1}(k)|$, $|X_{N_n-2}(k)|$, . . . , $|X_{N_n-n1}(k)|$); computing the extreme value of the group of characteristic values to obtain the optimal interception length N.

The first peak value that represents the noise component refers to the first peak value after removing the noise DC component (i.e. the first peak value in the medium-high frequency). As shown in FIGS. 5A-5M, the heavy peak pulse spectral lines in each amplitude spectrum are the first peak values that represent the noise frequency components.

Figures 5A, 5B:
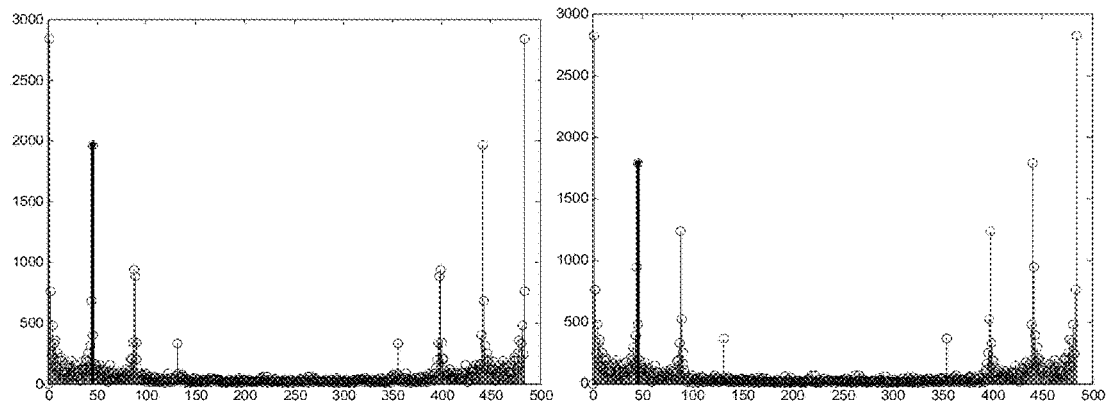
FIGS. 5A-5M are the amplitude spectrum diagrams of thirteen sequences of different lengths in the embodiment of the present invention, wherein the heavy line refers to the first spectral peak of the noises.
Figures 5C, 5D:
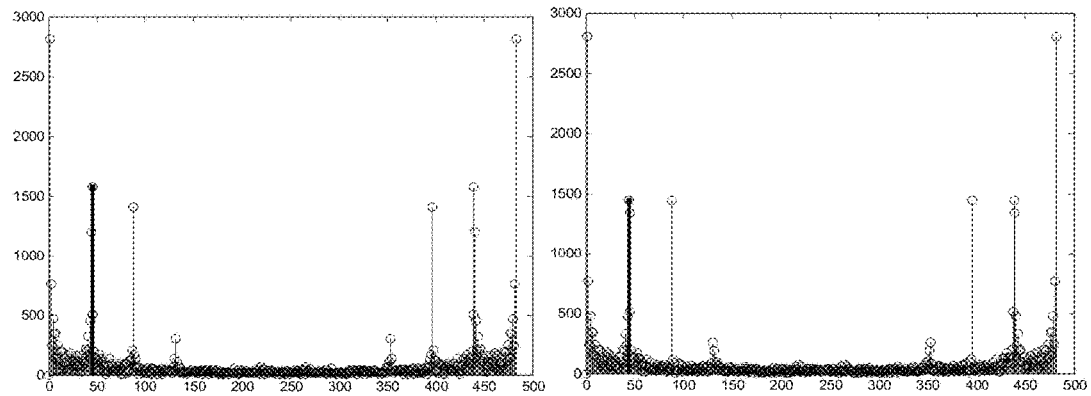
Figures 5E, 5F:
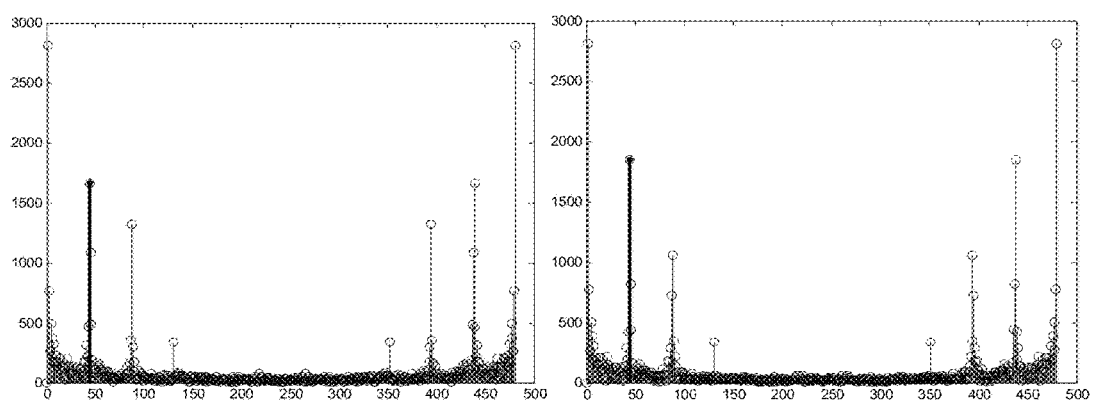
Figure 5G:
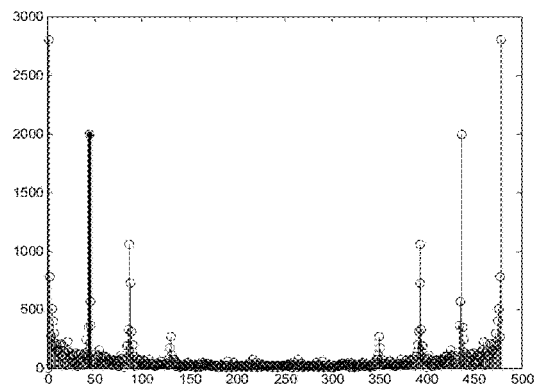
Figure 5H:
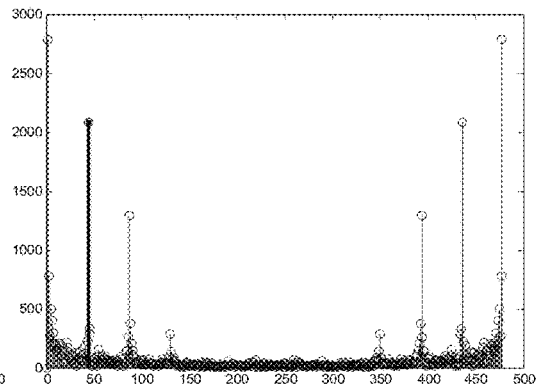
Figure 5I:
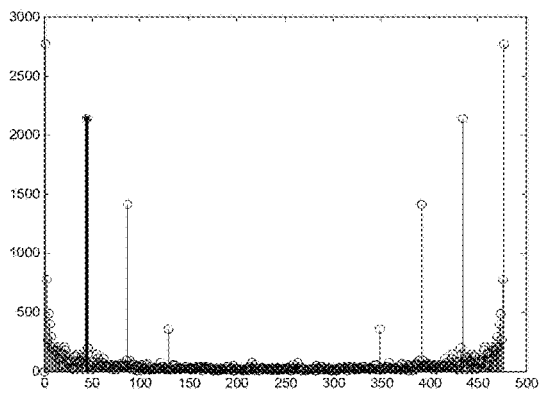
Figure 5J:
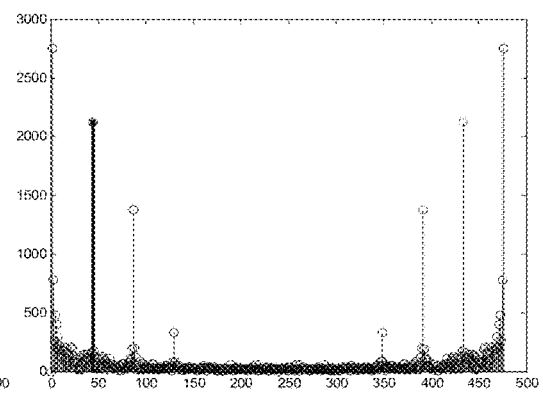
Figure 5K:
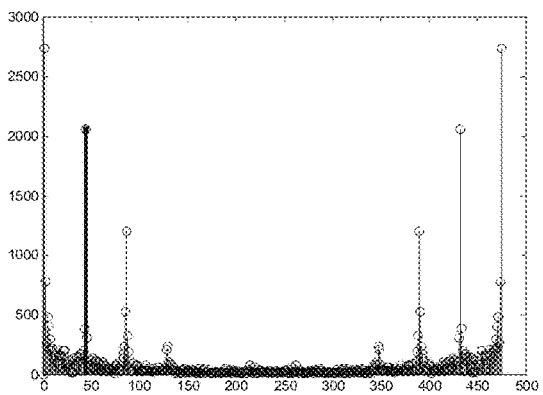
Figure 5L:
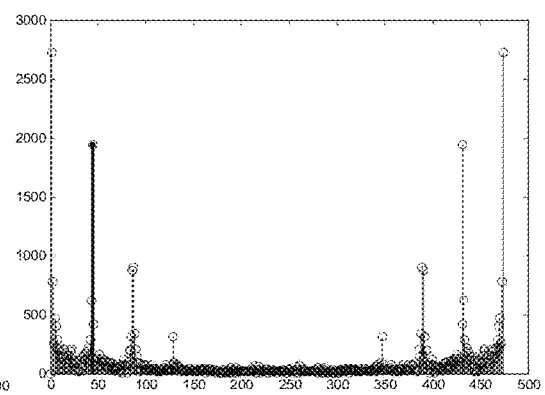
Figure 5M:
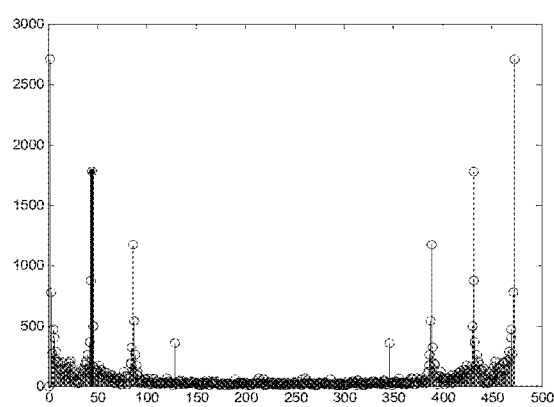
Figure 5N:
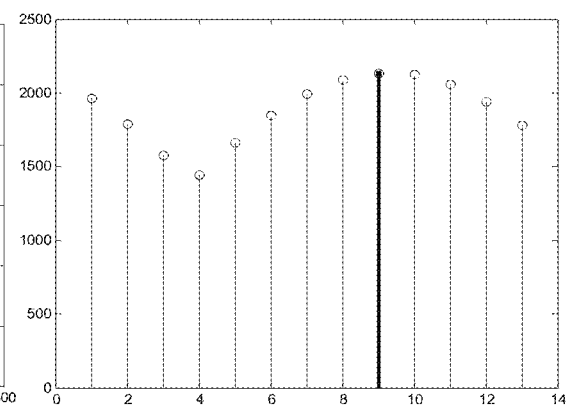
FIG. 5N is a spectral peak diagram composed of the first spectral peaks of the noises in the thirteen diagrams FIGS. 5A-5M of the embodiment of the present invention, wherein the heavy line is the maximum value among the spectral peaks.

An ergodic local interval is adopted by the present invention to find out the local maximum (i.e. the first peak value of the noise frequency component). The method of how to compute the corresponding amplitude spectrum coordinates of the first peak values is shown in S1, here the corresponding coordinates of the first peak values which indicate the noise component in each amplitude spectrum of the new sequences of different lengths must be near coordinate $k_m$. Therefore, in the present invention, the ergodic local interval [0.5 $k_m$, 1.5 $k_m$] is used to find out the local maximum, and all peak values are extracted to be a group of characteristic values. As shown in FIG. 5, the first peak values that represent the noise components of $|X_{N_n-0}(k)|$, $|X_{N_n-1}(k)|$, $|X_{N_n-2}(k)|$, ..., $|X_{N_n-n1}(k)|$ in step S21 are extracted, since N1=12, there are thirteen values in total, figuring out the extreme therein (i.e. the value indicated by the heavy line in FIG. 5N. That is to say, the corresponding sequence length of the extreme is the optimal interception length. Taking the embodiment for example, the corresponding coordinate p of the extreme in FIG. 5N is computed, wherein p=9, Nn=485, so that the corresponding sequence length is Nn-(p-1)=477, the optimal interception length N=477 (i.e. the optimal interception length N=Nn-(p-1), wherein Nn is the sequence length, (p-1) is the number of removal points).

The method for figuring out the extreme value is that, firstly figuring out the maximum of the group of characteristic values, subsequently determining whether the maximum is the first value, if it is not the first value, then the maximum is the desired extreme value, if it is the first value, then removing the first value from the group of characteristic values and repeating to find out the maximum in the left number series until the maximum is not the first value.

Figure 6A:
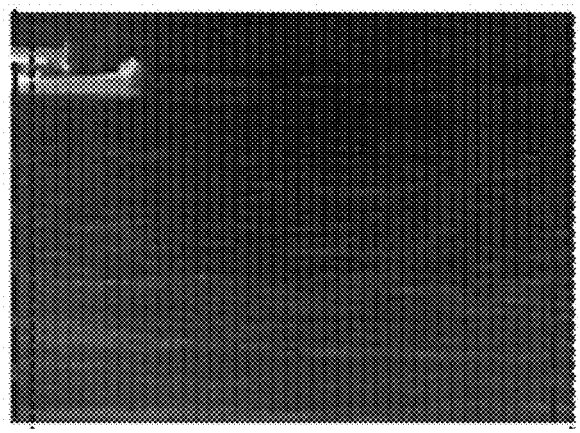
FIGS. 6A-6C are schematic diagrams of splitting the to-be-filtered image into two optimum to-be-filtered sub-images in the embodiment of the present invention.
Figure 6B:
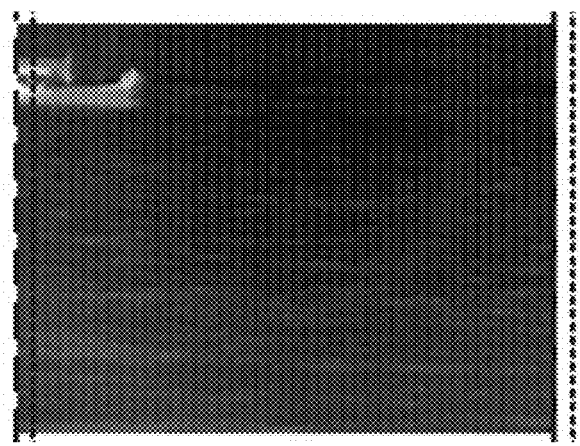
Figure 6C:
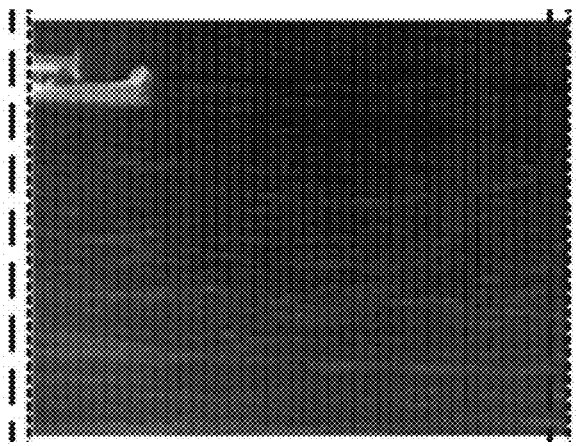

S3: Splitting the to-be-filtered image Aim with a size of M×N$_n$ into a pair of the optimum to-be-filtered sub-images Bim and Cim with a size of M×N according to the optimal interception length N;

In the present invention, the method used for splitting the image Aim into a pair of the optimum to-be-filtered sub-images Bim and Cim is that of selecting the first N rows as a sub-image Bim, selecting the latter N rows as another sub-image Cim. Hereinafter, the process is demonstrated with reference to an embodiment. In terms of image a shown in FIG. 3A, the computed value is N=477, so that the first four-hundred-seventy-seven rows are defined as a sub-image b, and the latter four-hundred-seventy-seven rows are defined as a sub-image c. As shown in FIG. 6A, FIG. 6B indicates sub-image b, FIG. 6C indicates sub-image c.

S4: Detecting the position of the noise frequency component for each sub-image, determining the parameters of the filter, and designing a notch-comb filter to filter the two optimum to-be-filtered sub-images Bim and Cim respectively, obtaining filtered sub-images Bimf and Cimf.

In the present invention, notch-com filter is selected to filer the optimum to-be-filtered sub-images according to the frequency properties of stripe noise, wherein the notch filter includes ideal type, Butterworth type, and Gaussian type. The Butterworth notch filter is selected in the present invention. The method for designing notch filter is that, firstly detecting coordinate location of all possible noise frequency components, after that designing different notch pair according to the magnitude of the amplitude for each pair of frequency components. In the present invention, the second-order band-stop Butterworth notch filter is adopted, the main differences of different notch pair reflect in the difference about the center frequency and cutoff frequency. Since the centers of the notch pairs show up in even intervals, the filter is comb shaped.

Figure 7:
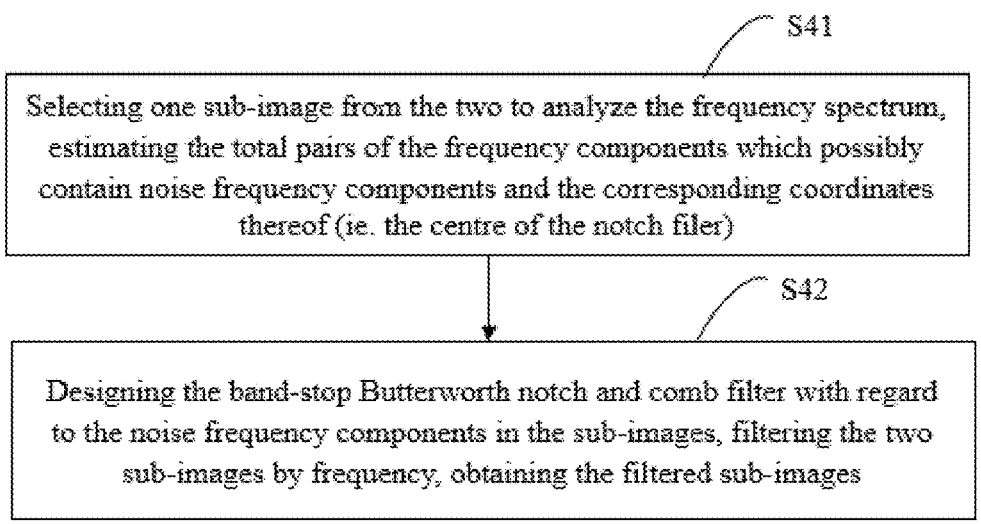
FIG. 7 is a detailed flow chart for the filter processing of the two sub-images.

Furthermore, as shown in FIG. 7, the S4 further includes the following steps:

S41: selecting sub-image Bim from the two sub-images for spectral analysis, estimating the total number of pairs Np of all possible noise frequency components, and corresponding coordinates $(u_{i1},v_{i1})$ and $(u_{i2},v_{i2})$ for sub-image Bim, wherein i=1 ... Np, and the coordinates $(u_{i1},v_{i1})$ and $(u_{i2},v_{i2})$ are the centers of the notch filter.

In the present invention, the sub-image Bim from the two sub-images is selected for spectral analysis, and the total number of pairs Np of all possible noise frequency components for sub-image Bim is estimated, wherein the method for estimating the total number of pairs is that of selecting the intermediary rows from the to-be-filtered sub-image Bim to record as a sequence $x_b(n)$. The length of the sequence is N. Subsequently the amplitude spectrum $|X_b(k)|$ is computed to find out the interval between each frequency component. In the present invention, the method is similar to the described ergodic local interval $[0.5\ k_m, 1.5\ k_m]$ in step S22, wherein $k_m$ is computed by S1. The method is that of figuring out the local maximum (i.e. the first peak value of the noise frequency component), assuming that the corresponding abscissa of the first peak value is q, so that the interval of the noise frequency components is $\delta=q-1$.

The all points possibly containing noise frequency components can be figured out according to the interval $\delta$ between each noise frequency component. It can be known from the symmetry property of the Discrete Fourier Transform that the noise frequency components also show up in pairs. The maximum of existing pairs $N_p$ of the noise frequency components is computed according to the interval $\delta$, and the solution formula is shown as formula (2), wherein $\lfloor \cdot \rfloor$ indicates round down (i.e. the decimal part is removed, and the integer is kept unchanged).

$$N_p = \left\lfloor \frac{N+2}{2\delta} \right\rfloor \tag{2}$$

With regard to images having vertical stripe noise, there is a correlation between the amplitude spectrum $|X_b(k)|$ acquired from one-dimensional Discrete Fourier Transform for a selected row and the amplitude spectrum $|F(u, v)|$ acquired from two-dimensional Discrete Fourier Transform for the whole image, which is the equivalent interval of stripe noise frequency components of the two. The vertical stripes in an image are concentrated on the horizontal axis of Fourier frequency domain power spectrum, whose frequency components are evenly shown up by interval $\delta$. The frequency spectrum $|F(u, v)|$ of an image is centralized to acquire centralized frequency spectrum F(u, v) and amplitude spectrum $F_A(u,v)=|F(u, v)|$. According to formulas (3) and (4), the locations of Np pairs of noise frequency components are acquired. Wherein the frequency components in $(u_{i1}, v_{i1})$ and $(u_{i2}, v_{i2})$ are a pair of symmetrical frequency components around the center which possibly contain noise frequency components. The subscript i indicates different frequency component pairs, M refers to the number of rows of the image, N refers to the number of columns of the image (i.e. the size of the processed image is M×N).

$$\begin{cases} u_{i1} = \frac{M}{2}, \\ v_{i1} = \frac{N}{2} - i \times \delta, \end{cases} \tag{3}$$
$$i = 1, 2, \ldots, N_p$$

$$\begin{cases} u_{i2} = \frac{M}{2}, \\ v_{i2} = \frac{N}{2} + i \times \delta, \end{cases} \tag{4}$$
$$i = 1, 2, \ldots, N_p$$

S42: With respect to the noise frequency components in the sub-images, a band-stop Butterworth notch-comb filter is designed for filtering the two sub-images Bim and Cim to obtain the filtered sub-images Bimf and Cimf.

In the present invention, the notch-comb filter is constructed by the high-pass filter product whose center has been transported to the center of notch filter in parallel. The pattern is shown as formula (5).

$$H_{NR}(u,v) = \Pi_{k=1}^{Q} H_k(u,v) H_{-k}(u,v) \tag{5}$$

where Q indicates the number of the notch pairs, $H_k(u, v)$ and $H_{-k}(u, v)$ are high-pass filters whose centers respectively locate on $(u_k, v_k)$ and $(-u_k, -v_k)$, wherein the center is determined by the frequency rectangle center $$\left(\frac{M}{2}, \frac{N}{2}\right),$$

and the size of the frequency rectangle should equal to that of the to-be-filtered image. For each filter, the distance is computed by formulas (6) and (7):

$$D_k(u, v) = \left[\left(u - \frac{M}{2} - u_k\right)^2 + \left(v - \frac{N}{2} - v_k\right)^2\right]^{1/2} \tag{6}$$

$$D_{-k}(u, v) = \left[\left(u - \frac{M}{2} + u_k\right)^2 + \left(v - \frac{N}{2} + v_k\right)^2\right]^{1/2} \tag{7}$$

Figure 8:
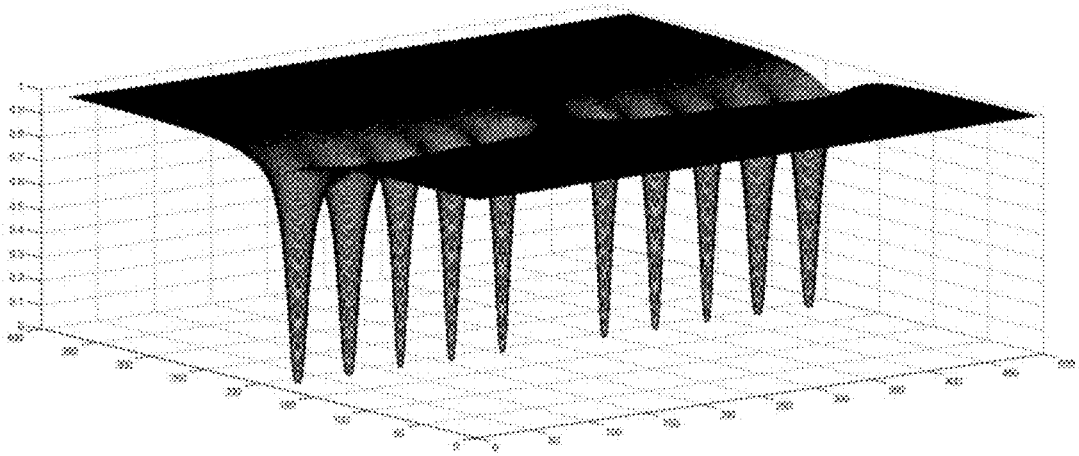
FIG. 8 is a schematic diagram of the first-order Butterworth notch-comb filter including five pairs of notches in the embodiment of the present invention.

In the present invention, the Butterworth notch-comb filter is adopted, the following is a n-order Butterworth notch-comb filter containing three pairs of notch:

$$H_{NR}u, v = \prod_{k=1}^{3} \left[\frac{1}{1 + \left[\frac{D_{0k}}{D_k(u,v)}\right]^{2n}}\right] \left[\frac{1}{1 + \left[\frac{D_{0k}}{D_{-k}(u,v)}\right]^{2n}}\right]$$

wherein $D_k$ and $D_{-k}$ is computed by formulas (6) and (7). The constant $D_{0k}$ is the same for each notch pair, but the constant $D_{0k}$ can be also different for different notch pair. FIG. 8 shows a one-order Butterworth notch-comb filter with five notch pairs.

It is known from step S41 that there are, at most, Np pairs of noise frequency components (i.e. less than or equal to Np pairs). In the embodiment of the present invention, the method for filtering in frequency domain is not to be realized by directly designing a filter containing Np notch pairs, but to repeatedly design the filter only containing one notch pair to successively filter out each pair of noise components of the images, until all the noise frequency components are filtered out.

Figure 9:
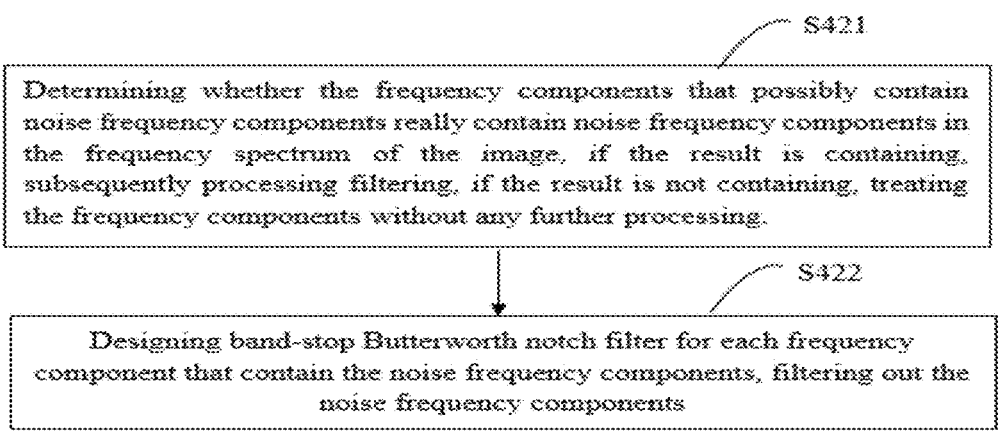
FIG. 9 is a detailed flow chart for filtering out one pair of noise frequency components in the embodiment of the present invention.

Now the whole filtering process is demonstrated with reference to the embodiment.

f(x, y) is defined as a digital image with a size of M×N, then for which two-dimensional Fourier transform F(u, v) is computed by formula (8) as:

$$F(u, v) = \sum_{x=0}^{M-1} \sum_{y=0}^{N-1} f(x, y) \exp\left(-j2\pi\left(\frac{ux}{M} + \frac{vy}{N}\right)\right) \tag{8}$$

f(x, y) is multiplied by $(-1)^{x+y}$ before F(u, v) being computed, then the centralized frequency spectrum of the images can be obtained by the Fourier transform. In the subsequent filtering process, it is assumed that F(u, v) indicates the centralized frequency spectrum. According to step S41, all possible noise frequency components in the frequency components containing noises are in $(u_k, v_k)$ and $(-u_k, -v_k)$, wherein i=1 ... Np. Furthermore, as shown in FIG. 9, the specific filtering process further includes the following steps:

S421: determining whether the frequency components in $(u_k, v_k)$ and $(-u_k, -v_k)$ really containing noise frequency components, if the result is containing, subsequently filtering processing, if the result is not containing, the frequency components being treated without any further processing.

In the present invention, the noise frequency components found by step S41 do not always really contain the noise frequency components, so it should be firstly determined whether frequency components at the pair of points really contain the information of noise frequency component before being filtered out.

The determination method adopted by the present invention is that of firstly computing the amplitude spectrum $F_A(u, v)=|F(u,v)|$ of the centralized image. Since the amplitude is symmetrical around the center and centered on $(u_{i1}, v_{i1})$, a neighborhood of origin $S_{FAi}$ with a size of $(2m+1)(2n+1)$ and a center on $(u_{i1}, v_{i1})$ is selected. Another neighborhood of origin $S_{FAEi}$ with a size of $(2m+3)(2n+3)$ is selected. $S_{FAi}$ and $S_{FAEi}$ are defined as below:

$$S_{FAi} = \begin{pmatrix} F_A(u_{i1}-m, v_{i1}-n) & \cdots & F_A(u_{i1}-m, v_{i1}) & \cdots & F_A(u_{i1}-m, v_{i1}+n) \\ \vdots & & \vdots & & \vdots \\ F_A(u_{i1}, v_{i1}-n) & \cdots & F_A(u_{i1}, v_{i1}) & \cdots & F_A(u_{i1}, v_{i1}+n) \\ \vdots & & \vdots & & \vdots \\ F_A(u_{i1}+m, v_{i1}-n) & \cdots & F_A(u_{i1}+m, v_{i1}) & \cdots & F_A(u_{i1}+m, v_{i1}+n) \end{pmatrix}$$

$$S_{FAEi} = \begin{pmatrix} F_A(u_{i1}-m-1, v_{i1}-n-1) & \cdots & F_A(u_{i1}-m-1, v_{i1}) & \cdots & F_A(u_{i1}-m-1, v_{i1}+n+1) \\ \vdots & & \vdots & & \vdots \\ F_A(u_{i1}, v_{i1}-n-1) & \cdots & F_A(u_{i1}, v_{i1}) & \cdots & F_A(u_{i1}, v_{i1}+n+1) \\ \vdots & & \vdots & & \vdots \\ F_A(u_{i1}+m+1, v_{i1}-n-1) & \cdots & F_A(u_{i1}+m+1, v_{i1}) & \cdots & F_A(u_{i1}+m+1, v_{i1}+n+1) \end{pmatrix}$$

then the determination threshold TF of whether the frequency point needs noise filtering can be computed as the below equation:

$$TF = \text{med}\{F_A(u,v) | F_A(u,v) \in S_{FAEi} - S_{FAi}\}$$

Wherein $S_{FAEi} - S_{FAi}$ indicates the set whose objects all belonging to set $S_{FAEi}$ but not to set $S_{FAi}$, the symbol of med{•} indicates for computing the mid-value of the set (i.e. the mid-value is the value of the object which is arranged in the middle by ordering the objects in the set from the largest to the smallest). In the present invention, the initial value is typically selected to be m=n=2, if the filtering result is not good, the size of neighborhood can be accordingly enlarged depends on the actual situation. The maximum of the objects in set $S_{FAi}$ can be computed as:

$$T = \max\{F_A(u,v) | F_A(u,v) \in S_{FAi}\}$$

Wherein $\{F_A(u, v) | F_A(u, v) \in S_{FAi}\}$ indicates the set of all objects belonging to neighborhood $S_{FAi}$, the symbol of max{•} indicates for computing the maximum of the set.

If T>TF, the frequency components in $(u_{i1}, v_{i1})$ and $(u_{i2}, v_{i2})$ are supposed to contain noise frequency components which need to be filtered out; otherwise, if T<TF, the frequency components in $(u_{i1}, v_{i1})$ and $(u_{i2}, v_{i2})$ are supposed to not contain noise frequency components, and it is unnecessary to carry out filtering process. After that, the next pair of frequency components, which possibly contain noise frequency components, are considered.

S422: The band-stop Butterworth notch filters are respectively designed to filter out the noise frequency components to obtain the filtered sub-images Bimf and Cimf with respect to each of the frequency components containing noise frequency components.

The position where each pair of noise frequency components locates typically has different amplitudes, so the different notch filters should be respectively designed regarding different noise frequency components. In the present invention, considering the different noise frequency components, the idea for designing the notch filters is the same. Hereinafter, a pair of noise frequency components is taken for example to illustrate the process of designing the notch filter.

It is assumed that the i-th pair of frequency components (i.e. the frequency components in $(u_{i1}, v_{i1})$ and $(u_{i2}, v_{i2})$) contains noise frequency components. Now the filters are designed to filter the frequency components out. Furthermore, as shown in FIG. 9, the process for designing the filter includes following steps:

S422: selecting the to-be-processed noise frequency components, computing the distances from each point to the corresponding coordinate of the selected noise frequency components (i.e. determining distances $D_{ki1}(u,v)$ and $D_{ki2}(u,v)$).

Wherein, $(u_{i1}, v_{i1})$ and $(u_{i2}, v_{i2})$ are the centers of the filters whose centers have been centralized, the distance is computed according to formulas (6) and (7) as below:

$$D_{ki1}(u,v) = [(u-u_{i1})^2 + (v-v_{i1})^2]^{1/2}$$

$$D_{ki2}(u,v) = [(u-u_{i2})^2 + (v-v_{i2})^2]^{1/2}$$

It can be known from formulas (3) and (4) that, $$u_{i1} = \frac{M}{2}, v_{i1} = \frac{N}{2} - i \times \delta,$$

wherein M indicates the number of rows of the frequency rectangle, N indicates number of columns of the frequency rectangle, δ is the interval, computed by step S41, between each noise frequency component. The cutoff frequency $D_{0ki}$ is determined after the distance is determined.

S4222: The cutoff frequency $D_{0ki}$ is determined for the selected to-be-processed noise frequency component.

Figure 10:
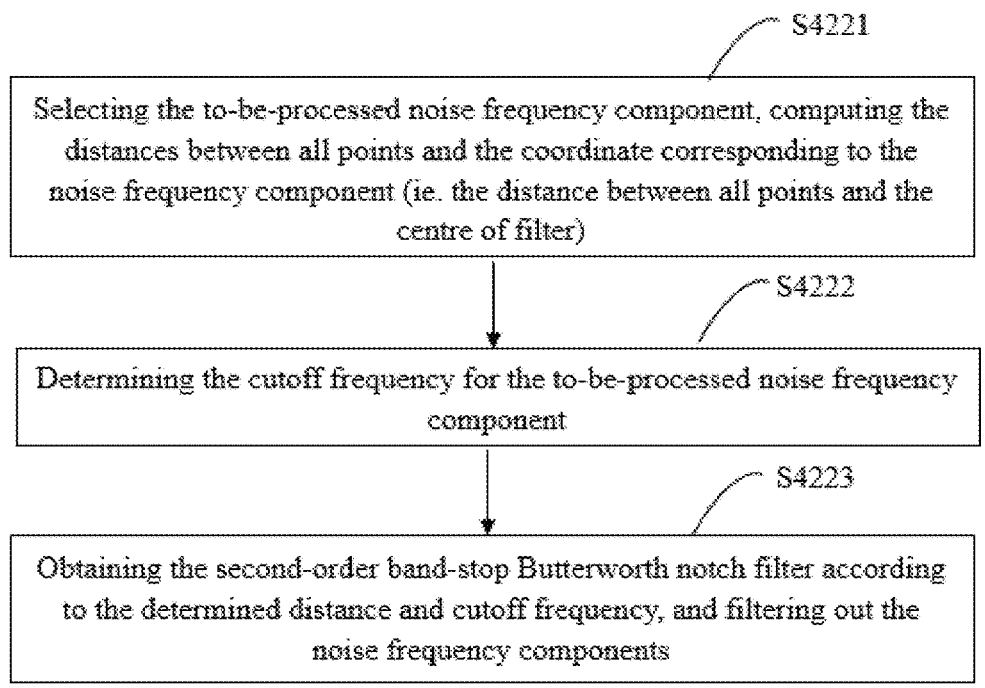
FIG. 10 is a detailed flow chart for designing a second-order band-stop Butterworth notch filter in the embodiment of the present invention.

In the embodiment of the present invention, the method for determining the cutoff frequency of filter is that of firstly initializing a smaller cutoff frequency to get a filter function for filtering the image, then checking the filtering result for updating the cutoff frequency, until the desired filtering result is acquired. Furthermore, as shown in FIG. 10, the process for determining the cutoff frequency and filtering the image in frequency domain includes the following steps:

S42221: initializing the cutoff frequency $D_{0ki}$ of the filter with respect to the selected to-be-processed noise frequency component.

In the embodiment of the present invention, the cutoff frequency $D_{0ki}$ is initialized with a smaller value, the initial cutoff frequency $D_{0ki}=1$.

S42222: according to the acquired distance and cutoff frequency, a filter containing a pair of notches being designed to filter out the noise frequency components in $(u_{i1}, v_{i1})$ and $(u_{i2}, v_{i2})$ of the image, and the filtered image being obtained.

In the embodiment of the present invention, a second-order band-stop Butterworth notch filter containing a pair of notches is designed and expressed as below:

$$H_{NRi}(u,v) = \left[\frac{1}{1+\left[\frac{D_{0ki}}{D_{ki1}(u,v)}\right]^4}\right]\left[\frac{1}{1+\left[\frac{D_{0ki}}{D_{ki2}(u,v)}\right]^4}\right]$$

Wherein, $D_{ki1}(u, v)$ and $D_{ki2}(u, v)$ are the distances determined by step S4221.

The process for filtering in frequency domain is to multiply the centralized frequency spectrum with the filter function to obtain the filtering result $\hat{F}(u, v)$:

$$\hat{F}(u,v) = F(u,v) H_{NRi}(u,v)$$

S42223: Checking the filtered amplitude spectrums of the image to determine whether the amplitudes of noise frequency components in $(u_{i1}, v_{i1})$ and $(u_{i2}, v_{i2})$ and the neighborhood thereof are reduced to the acceptable range. If the amplitudes are reduced to the acceptable range, then processing the next pair of noise frequency components, otherwise, updating the cutoff frequency and redesigning a filter for filtering until the noise frequency components are reduced to the acceptable range by the newly designed filter, which specifically is that:

first computing the amplitude spectrum (i.e. $\hat{F}(u, v) = |\hat{F}(u,v)|$), of the filtering result $\hat{F}(u, v)$. A neighborhood $S_{\hat{F}Ai}$ is defined as below, which is centered on $(u_{i1}, v_{i1})$, and with a size of (2m+1)(2n+1), $$S_{\hat{F}Ai} = \begin{pmatrix} \hat{F}_A(u_{i1}-m, v_{i1}-n) & \cdots & \hat{F}_A(u_{i1}-m, v_{i1}) & \cdots & \hat{F}_A(u_{i1}-m, v_{i1}+n) \\ \vdots & & \vdots & & \vdots \\ \hat{F}_A(u_{i1}, v_{i1}-n) & \cdots & \hat{F}_A(u_{i1}, v_{i1}) & \cdots & \hat{F}_A(u_{i1}, v_{i1}+n) \\ \vdots & & \vdots & & \vdots \\ \hat{F}_A(u_{i1}+m, v_{i1}-n) & \cdots & \hat{F}_A(u_{i1}+m, v_{i1}) & \cdots & \hat{F}_A(u_{i1}+m, v_{i1}+n) \end{pmatrix}$$

make, $$TH = \max\{\hat{F}_A(u, v) | \hat{F}_A(u, v) \in S_{\hat{F}Ai}\}$$

wherein $\{\hat{F}_A(u, v)|\hat{F}_A(u, v) \in S_{\hat{F}Ai}\}$ indicates the set that holds all objects belonging to the neighborhood $S_{\hat{F}Ai}$, the symbol of max{•} indicates for computing the maximum of the set.

Comparing TH and TF, wherein TF is the same one in step S421, if TH<TF, then it is supposed that the pair of noise frequency components is filtered out, the present cutoff frequency is the final cutoff frequency of the notch filter; if TH>TF, then the value of the cutoff frequency is updated with a certain step size. In the present invention $D_{0ki}=D_{0ki}+5$ is used during the above updating, subsequently the filter $H_{NRi}(u, v)$ is redesigned by going to step S42222 and the noise frequency components are filtered out again. After repeatedly updating the cutoff frequency, the filtering for image enables to render TH<TF, then the cutoff frequency therein is the final cutoff frequency.

S4223: According to the determined distance and cutoff frequency, obtaining the second-order band-stop Butterworth notch filter to filter out the selected to-be-processed noise frequency components.

S5: Adjusting the brightness of the two filtered sub-images Bimf and Cimf, and then combinating Bimf and Cimf to obtain a filtered final image Aimf, wherein the method of combination for the two filtered sub-images Bimf and Cimf is that of computing mean value for the overlapping region, and effective value for non-overlapping region. Before the combination, the sub-images are firstly treated with brightness adjustment.

The frequency spectrums of the frequency domain filtered sub-images are $\hat{F}_B(u, v)$ and $\hat{F}_C(u, v)$ respective. Because of the differences of noise and useful information between the two sub-images, the DC components of the filtered sub-images are inconsistent, that is to say, the brightness of the two sub-images are not inconsistent. Therefore, before the combination of the sub-images, the DC components of the two sub-images are firstly adjusted. The specific method is computing the mean value of the DC components of $\hat{F}_B(u, v)$ and $\hat{F}_C(u, v)$ as the respective DC components of both. Namely, make $$\hat{F}(0,0) = 1/2(\hat{F}_B(0,0) + \hat{F}_C(0,0))$$

then make, $$\hat{F}_B(0,0) = \hat{F}(0,0), \hat{F}_C(0,0) = \hat{F}(0,0)$$

After adjusting the DC components, the image is restored to the spatial domain by Fourier inversion theorem. After $\hat{F}_B(u, v)$ and $\hat{F}_C(u, v)$ treated by brightness adjustment and restored to spatial domain by Fourier inversion theorem, the sub-images are assumed as Bimf and Cimf.

Figure 11:
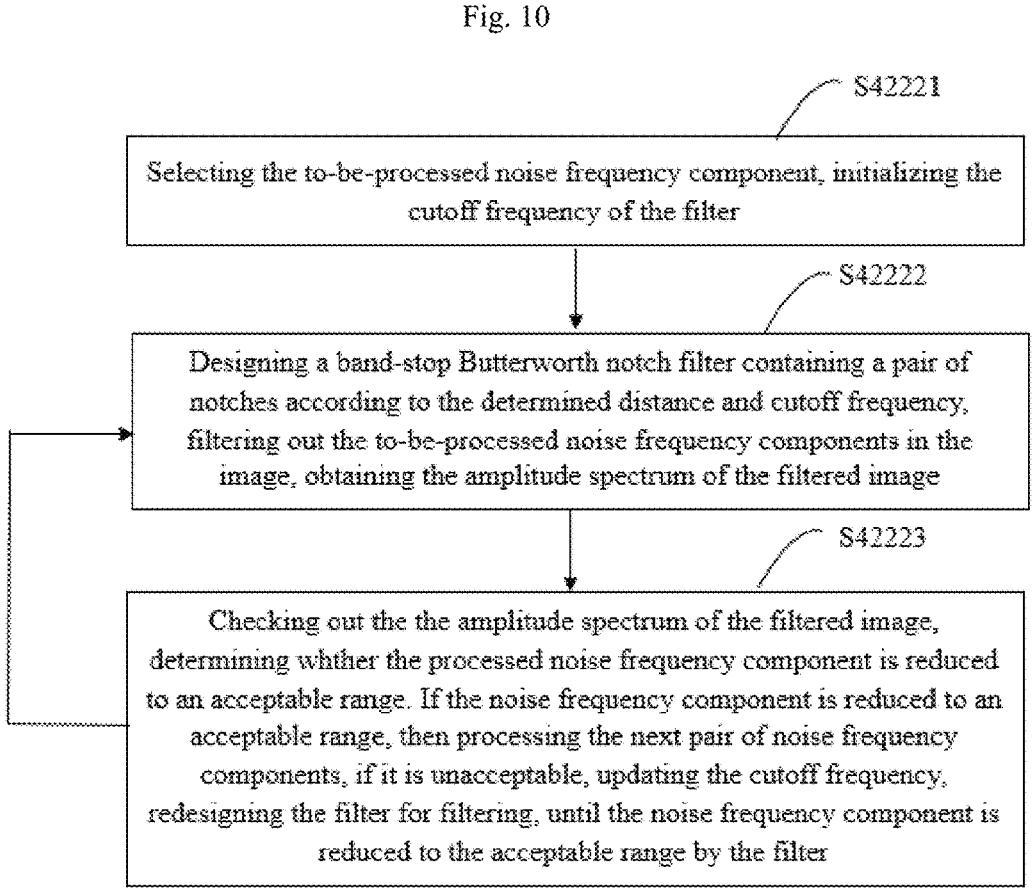
FIG. 11 is a detailed flow chart for determining the cutoff frequency of the filter in the embodiment of the present invention.
Figure 12:
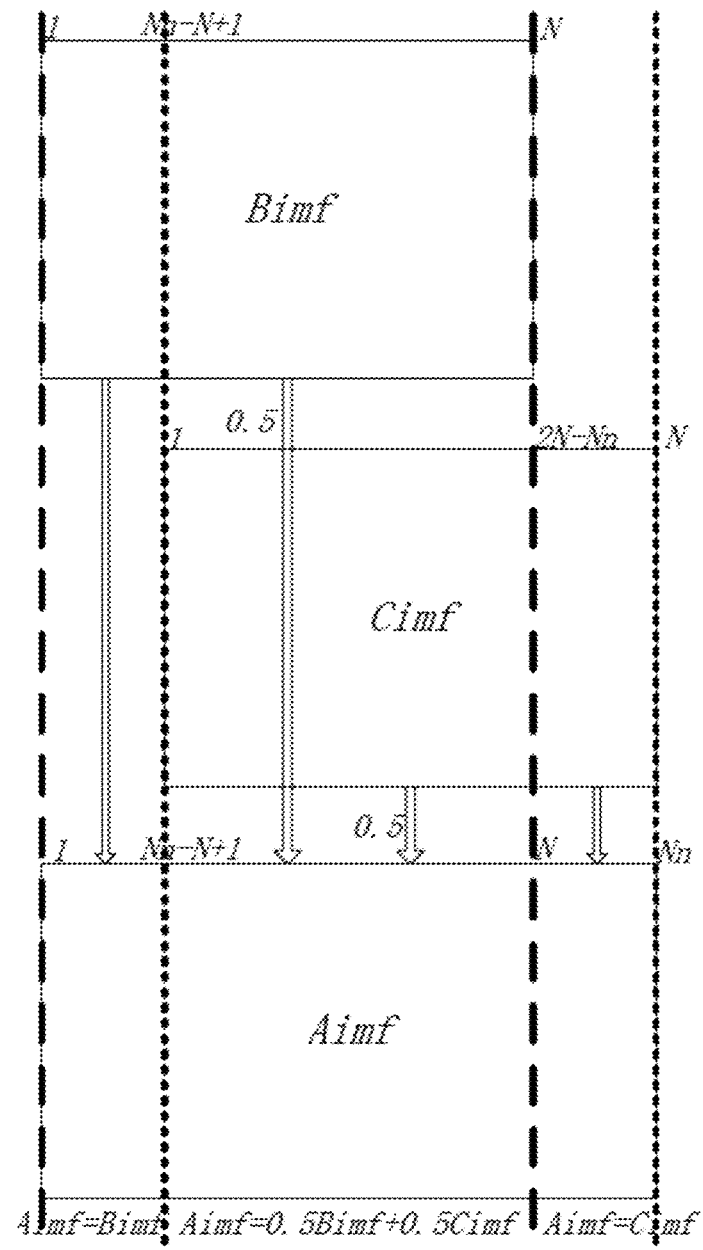
FIG. 12 is a schematic diagram of the image combination in the embodiment of the present invention.

It can be known from step S3 that the size of the original image Aim is $M \times N_n$, the sub-image Bim is the first N columns of the original image, the sub-image Cim is the latter N columns of the original image. Similarly, the sub-image Bim contains the information of the first N columns, the sub-image Cim contains the information of the latter N columns. The size of the final filtered image Aimf is $M \times N_n$. As shown in FIG. 11, the specific method for combination is that, the values of the final filtered image Aimf from the first row to the $(N_n-N)_{th}$ row are correspondingly selected from the values of the sub-image Bimf from the first row to the $(N_n-N)_{th}$ row; the values of the final filtered image Aimf from the $(N_n-N+1)_{th}$ row to the $N_{th}$ row are correspondingly selected from the mean value of the values of the sub-image Bimf from the $(N_n-N+1)_{th}$ row to the $N_{th}$ row and the values of the sub-image Cimf from the first row to the $(2N-N_n+1)_{th}$ row; the values of the final filtered image Aimf from the $(N+1)_{th}$ row to the $N_{n}^{th}$ row are correspondingly selected from the values of the sub-image Cimf from the $(2N-N_n+1)_{th}$ row to the N row. FIG. 12 is a schematic diagram of the image combination in the embodiment of the present invention. Specifically, the expression is as below:

$$Aimf(i, j) = \begin{cases} Bimf(i, j), & 1 \le j \le N_n - N \\ \frac{1}{2}[Bimf(i, j) + Cimf(i, j - (N_n - N))], & N_n - N + 1 \le j \le N \\ Cimf(i, j - (N_n - N)), & N + 1 \le j \le N_n \end{cases}$$

wherein $1 \le i \le M$, (i, j) indicates the pixel coordinate of a digital image.

FIGS. 13A-13H are the infrared image comparison diagrams before and after filtering for a couple of examples in the embodiment of the present invention, wherein the left column is the original image, the right column is the filtered result.

Additionally, the present invention also can process a large number of video data except for filtering a single image. In the present invention, the method for filtering the entire video data is that, infrared video data is first edited into small segments according to the intensity of the noise. Typically, since the status of the device itself and the immediate environment conditions are similar, the noises present in the successive frames of the image are also considered to be the same within this period of time. Thus, for the image of successive frames in this time period, the optimal interception length is believed to be the same, the noise frequency components in each sub-image are also the same. When the present invention is processing the images in the same time period, the optimal interception length and corresponding notch-comb filter are obtained by using the method in steps 1-5 to analyze a frame of image, then the other frames of the image in the video are directly processed. By this way, the calculation amount will be reduced, but the quality of filtering will not be lowered.

Figure 14:
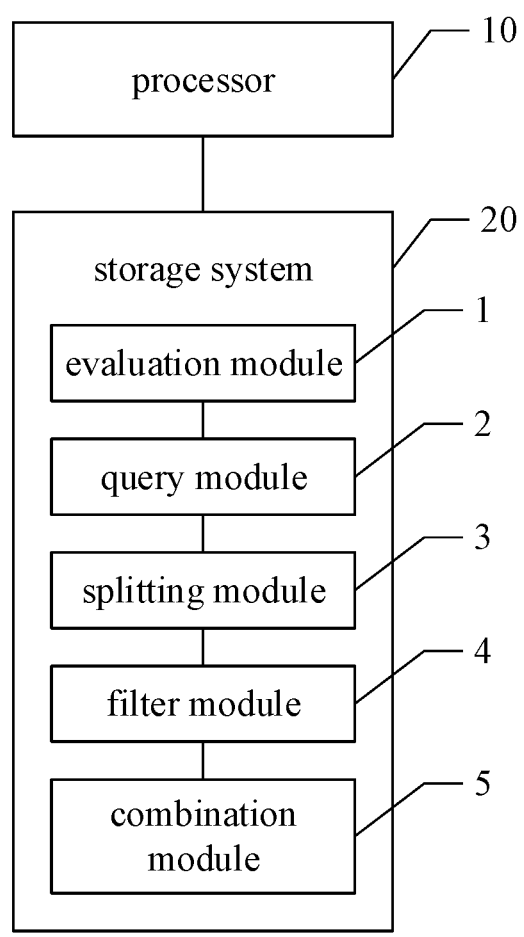
FIG. 14 is a system structure diagram of the method of eliminating stripe noise for infrared images provided by the embodiment of the present invention.

FIG. 14 is a system structure diagram of the method for eliminating stripe noise of infrared images provided by the embodiment of the present invention. For easy description, only the related part of the present invention is shown.

The system for eliminating stripe noise of infrared images, provided by the present invention, includes: a processor 10, a storage system 20, one or more programs that are stored in the storage system 20 and are executed by the processor 10. The one or more programs include: evaluation module 1, query module 2, splitting module 3, filter module 4, combination module 5. The evaluation module 1 is configured for selecting the specific row of data of a to-be-filtered image Aim, and obtaining the stripe noise width N1 from the information in the frequency spectrum of the specific row of data, wherein the stripe noise is a periodic noise employed the stripe noise width N1 as a noise period, and the stripe noise width N1 is an integer greater than 0. The query module 2 is configured for intercepting (N1+1) new sequences of different lengths from the specific row sequence of the image according to the stripe noise width N1, and obtaining a interception length N by analyzing the information from the amplitude spectrum of each new sequence, wherein the interception length N is the length of a sequence which has the most concentrated noise frequency components in the frequency spectrum, and the interception length N is greater than 0. The splitting module 3 is configured for splitting the to-be-filtered image Aim with a size of $M \times N_n$ into a pair of to-be-filtered sub-images Bim and Cim with a size of $M \times N$ according to the optimal interception length N, wherein M and $N_n$ are greater than 0. The filter module 4 is configured for detecting the position of the noise frequency component of the two to-be-filtered sub-images Bim and Cim, determining the parameters of a notch-comb filter, designing the notch-comb filter according to the parameters of the notch-comb filter, and obtaining a first sub-image Bimf and a second sub-image Cimf after a notch-comb filter is adopted to filter the two optimum to-be-filtered sub-images Bim and Cim respectively. The combination module 5 is configured for carrying out combination process to the first sub-image Bimf and the second sub-image Cimf to obtain an image Aimf.

The specific method for eliminating stripe noise in infrared images provided by the present invention is that, selecting the periodic alignment length according to the periodicity of noise to split an image into two sub-images which have overlapping regions, and subsequently frequency domain filtering the two sub-images. With respect to the frequency domain filtering, the noise frequency components are firstly figured out according to the characteristics of the Discrete Fourier Transform of the finite-length periodic sequence, after that, the adaptive band-stop Butterworth notch filter is designed for filtering each pair of noise frequency components. Finally, the two filtered sub-images are combined to obtain the final result. Compared with the existing stripe noise removal methods, the present invention needs less manpower participation, and has a higher batch processing efficiency and a better filtering result. The present invention is particularly suitable for processing infrared video data with a great deal of stripe noise.

Those of ordinary skill in the art can understand that the whole or partial process in the method of above embodiments can be implemented by using a program to control the relevant hardware. The program can be stored in a computer readable storage medium which is a ROM/RAM, a magnetic disk, an optical disk, and the like.

The above description is only the preferred embodiments of the present invention, and is not intended to limit the present invention, any modifications, equivalent replacement, improvement etc. within the spirit and principle of the present invention are intended to be included within the scope of the present invention.

What is claimed is:

1. A method of eliminating stripe noise for infrared images comprising following steps:
   S1: selecting a specific row of data from a to-be-filtered image Aim, and obtaining the stripe noise width N1 from information of a frequency spectrum of the specific row of data, wherein the stripe noise is a periodic noise employed the stripe noise width N1 as a noise period, and the stripe noise width N1 is an integer greater than 0;
   S2: intercepting (N1+1) new sequences of different lengths from a specific row sequence of the image according to the stripe noise width N1, and obtaining a interception length N by analyzing information of an amplitude spectrum of each new sequence, wherein the interception length N is the length of a sequence which has the most concentrated noise frequency components in the frequency spectrum, and the interception length N is greater than 0;
   S3: splitting the to-be-filtered image Aim with a size of M×$N_n$ into a pair of to-be-filtered sub-images Bim and Cim with a size of M×N according to the interception length N, wherein M and $N_n$ are greater than 0;
   S4: detecting the position of the noise frequency component of the pair of to-be-filtered sub-images Bim and Cim, determining the parameters of a notch-comb filter, designing the notch-comb filter according to the parameters of the notch-comb filter, and obtaining a first sub-image Bimf and a second sub-image Cimf after using the notch-comb filter to respectively filter the pair of to-be-filtered sub-images Bim and Cim, automatically;
   S5: carrying out a brightness adjustment and a combination process to the first sub-image Bimf and the second sub-image Cimf to obtain an image Aimf.

2. The eliminating method of claim 1, wherein in step S1, the stripe noise width $$N1 = \left\lfloor \frac{N_n}{k_m - 1} \right\rfloor,$$

wherein $\lfloor \cdot \rfloor$ indicates round down, in which a fraction part is removed and an integer is kept; $N_n$ indicates a length of a single row of data, $k_m$ indicates an amplitude spectrum coordinate corresponding to a first peak value at medium and high frequency.

3. The eliminating method of claim 1, wherein step S2 further comprises following steps:
   S2.1: defining in a discrete sequence x(n) with $N_n$ points by using the specific row of data having a length of $N_n$; intercepting (N1+1) new sequences of different lengths from the discrete sequence x(n) according to the stripe noise width N1, and computing amplitude spectrums of the new sequences of different lengths;
   S2.2: extracting the first peak value that represents noise component to be a group of characteristic values $\{|X_{N_n-0}(k=k_{m0})|, |X_{N_n-1}(k=k_{m1})|, |X_{N_n-2}(k=k_{m2})|, \ldots, X_{Nn-N1}(k)=k_{mN1}$ from the amplitude spectrums of the new sequences of different lengths $|X_{N_n-0}(k)|, |X_{N_n-1}(k)|, |X_{N_n-2}(k)|, \ldots, |X_{N_n-n1}(k)|)$, wherein $k_{m0}, k_{m1}, \ldots, k_{mN1}$ are the amplitude spectrum coordinate $k_m$ corresponding to the first peak value in each of the amplitude spectrum of the new sequences $|X_{N_n-0}(k)|, |X_{N_n-1}(k)|, |X_{N_n-2}(k)|, \ldots, |X_{N_n-n1}(k)|)$; computing an extremum of the group of characteristic values and obtaining the interception length N.

4. The eliminating method of claim 3, wherein in step S2.1, the step of intercepting (N1+1) new sequences of different lengths from the discrete sequence x(n) according to the stripe noise width N1 further comprises: defining a first point of the sequence as a start point, intercepting the first $N_n$ points, first $N_n-1$ points, first $N_n-2$ points, ..., first $N_n-N1$ points are selected sequentially to have the new sequences, the new sequences being recorded as $X_{N_n-0}(n)$, $X_{N_n-1}(n), X_{N_n-2}(n), \ldots, X_{N_n-N1}(n)$.

5. The eliminating method of claim 3, wherein in step S2.2, an ergodic local interval [0.5$k_m$, 1.5$k_m$] is implemented to find out a position of a local maximum so as to obtain a position of the first peak value of noise frequency component.

6. The eliminating method of claim 1, wherein the step of determining the parameters of a notch-comb filter further comprises:
   selecting the to-be-processed noise frequency component, and computing distances $D_{ki1}(u, v)$ and $D_{ki2}(u, v)$ between each point and coordinates corresponding to the noise frequency component;
   obtaining a cutoff frequency $D_{0ki}$ according to the selected to-be-processed noise frequency component;

obtaining the parameters of notch-comb filter according to the distance and the cutoff frequency.

7. The eliminating method of claim 1, wherein in step S5, the brightness adjustment further comprises: taking a mean value of DC components of the first sub image Bimf and the second sub-image Cimf as the DC component of each of the first sub image Bimf and the second sub-image Cimf, and the combination process further comprises: computing a mean value of the first sub-image Bimf and the second sub-image Cimf in an overlapping region, and an effective value in a non-overlapping region.

* * * * *